V. ALEXIEFF.
APPARATUS FOR STEERING MOVING OBJECTS PARTICULARLY SHIPS AND FLYING MACHINES.
APPLICATION FILED JUNE 2, 1911.
1,016,240.
Patented Jan. 30, 1912.
2 SHEETS—SHEET 1.
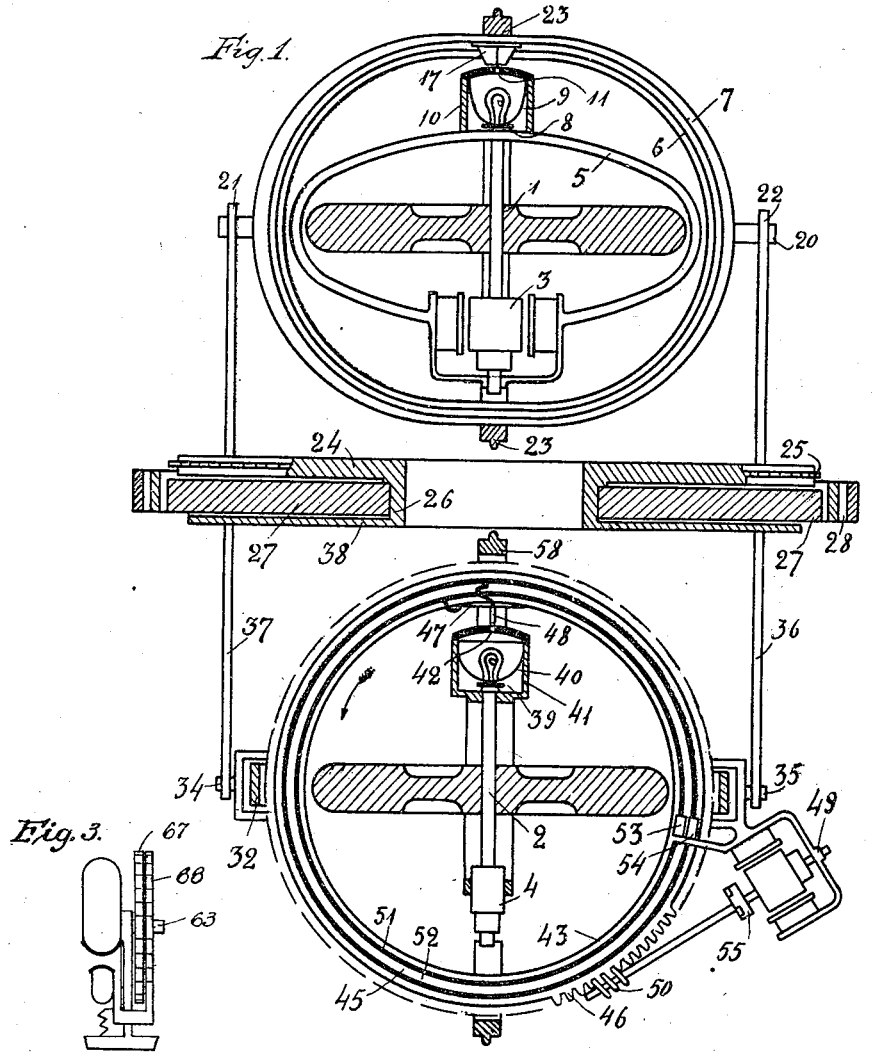
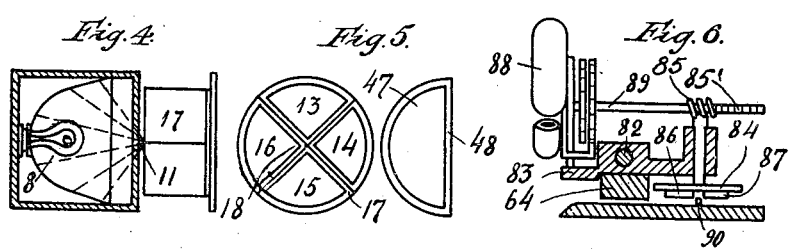
INVENTOR:
VALERIAN ALEXIEFF

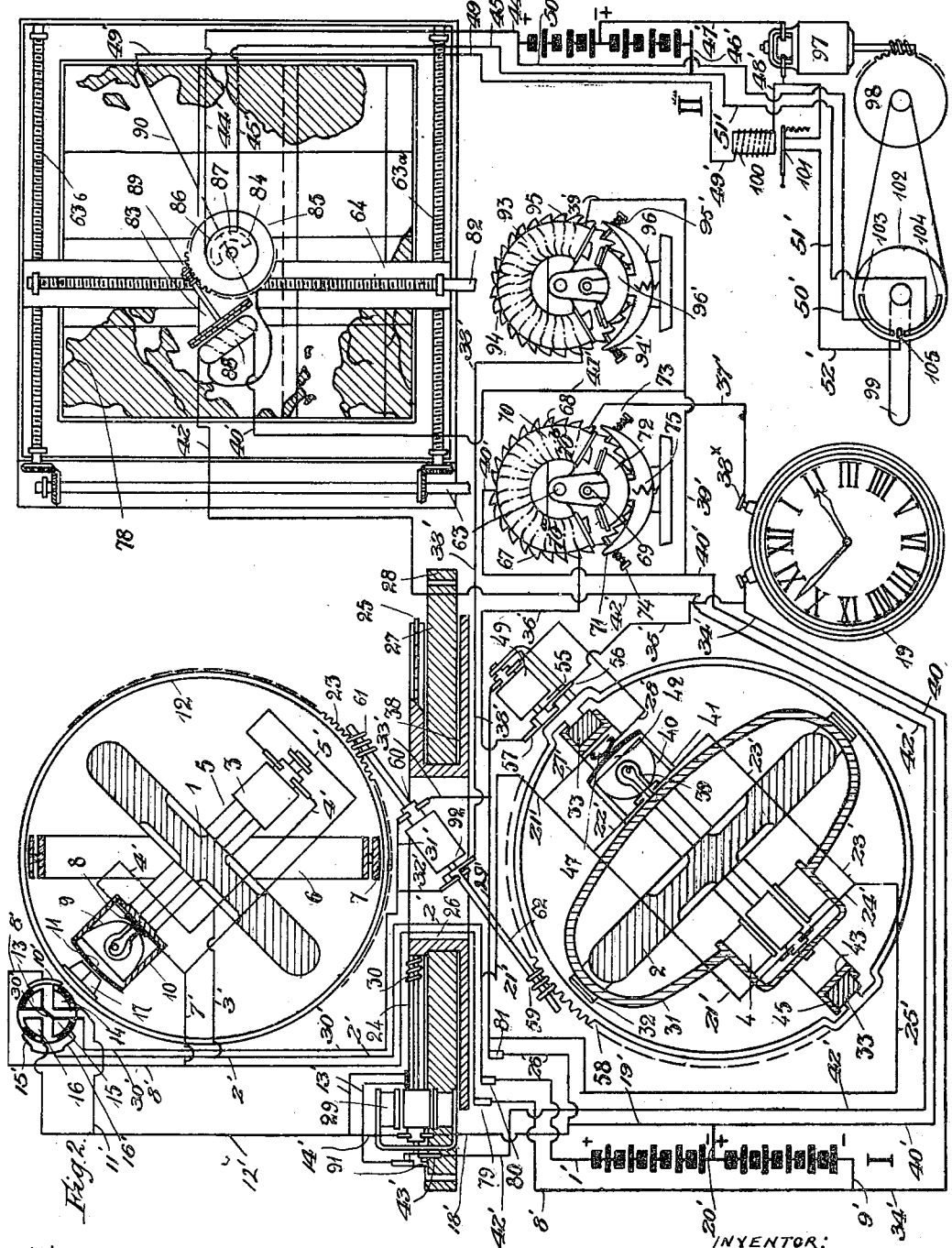

UNITED STATES PATENT OFFICE.

VALERIAN ALEXIEFF, OF ENSELI, PERSIA.

APPARATUS FOR STEERING MOVING OBJECTS, PARTICULARLY SHIPS AND FLYING-MACHINES.

1,016,240.      Specification of Letters Patent.      Patented Jan. 30, 1912.

Application filed June 2, 1911. Serial No. 630,815.

*To all whom it may concern:*

Be it known that I, VALERIAN ALEXIEFF, a subject of the Shah of Persia, and resident of Enseli, Persia, have invented a certain new and useful Improvement in Apparatus for Steering Moving Objects, Particularly Ships and Flying-Machines, of which the following is a specification.

This invention relates to apparatus for steering moving objects, particularly ships and flying machines, by chart or for mapping upon a chart the path of such moving object.

A fundamental feature of the improved apparatus is the arrangement of a member which carries two electrical contacts and is capable of moving automatically transversely and longitudinally over a chart in accordance with the movements of the object, the center between said contacts representing the locus of the object; said contacts coöperate with a conducting wire placed on the chart to represent the intended path of movement, thereby directing electric current in one or the other direction to a motor which correspondingly actuates the rudder. The member carrying the contacts is also capable of performing automatically a rotary movement, in a horizontal plane, when the course of the object is diverted. In this manner the rudder is automatically operated until the object is brought back to the intended course the contacts being then disposed on either side of the conducting wire.

The apparatus comprises two gyroscopes, the apparent movements of the axes of which relatively to the earth are employed to control the circuits of electromagnetic devices which impart the mentioned movements to the member carrying said contacts, as hereinafter described.

The improved apparatus is illustrated in the drawings in which—

Figure 1 is a vertical section in a plane at right angles to the meridian; Fig. 2 shows diagrammatically the general arrangement of the apparatus with the gyroscopes; Figs. 3, 4, 5 and 6 show details of Figs. 1 and 2.

For the sake of clearness, the connections of the magnet windings of all the motors are omitted. The latter must be supplied with continuous current so that when current is passed in reverse directions through the armatures, the direction of their rotation will be reversed.

The essential parts of the apparatus are two gyroscopes 1 and 2, the axis of gyroscope 1 being parallel to the axis of the earth while the axis of the gyroscope 2 is disposed in a plane vertical to the axis of the first mentioned gyroscope.

The gyroscope 1 (Figs. 1 and 2) is mounted in rings 5, 6 and 7 which in turn are carried by a ring 12. An electromotor 3 for rotating the gyroscope 1 and an electric lamp 8 with reflector 9 are arranged on the ring 5 which carries the spindle of the gyroscope 1. The current for operating the motor 3 and the lamp 8 passes through the positive terminal of the battery I through conductors 1', 2', 3' and 4', to the motor and lamp, thence through conductors 5', 6', 7'; 8' and 9' to the negative pole of the battery I. The lamp and reflector are surrounded by a casing 10 which is provided with a small aperture opposite the lamp, permitting the passage of rays from the lamp, (Figs. 1, 2, 4 and 5).

On the inside of the ring 12, opposite the lamp 8 are arranged four selenium cells 13, 14, 15, 16 which are divided by a screen 17 of cross shape. The intersection 18 of the screen covers the aperture 11 when the latter is disposed opposite it, thereby preventing the light of the lamp from shining on to the cells. When the lamp 8 moves upward the aperture 11 is exposed and a selenium cell 13 is illuminated. When the lamp moves downward the selenium cell 15 is illuminated while on movement of the lamp toward the right or left the selenium cells 14 and 16 respectively are illuminated. The selenium cells are interposed in electrical circuits hereinafter mentioned. The electrical resistance of selenium is greatly decreased by the action of light so that said cells on becoming illuminated close the corresponding circuits.

A semi-circular toothed rim 23 is provided on the outside of the ring 12. The ring 12 is carried by means of pivots 20 on bearing standards 21, 22 which are fixed on a disk 24 having a toothed rim 25. The disk 24 has a central boss which enters into the bore of another disk 27 which is supported by gimbal rings 28. The disk 24 may be rotated relatively to the disk 27 by an electromotor 29 which is carried on the disk 27, a worm 30 on the motor 29 engaging the toothed rim 25. A commutator 91 is mounted on the spindle of the worm 30. Current from the battery I is led to the armature winding of the electromotor 29 and the commutator 91 in one direction, by way of conductors 9', 8' and 10', the selenium cell 14, the conductors 11', 12', 13' and 14'; or in the reversed direction by way of conductors 1', 2' and 15', the cell 16 and the conductors 17', 12', 13' and 14', in order to reverse the direction of rotation of the motor. In either case, the current after passing the motor 29 returns to the neutral terminal of the battery I, by way of conductors 18', 19' and 20'.

The gyroscope is mounted in rings 31, 32, 33 the latter of which is of circular form and is carried on pivots 34, 35 in hangers 36, 37 which are fixed to a disk 38. The latter is rigidly secured to the lower end of the boss 26.

An electromotor 4 for actuating the gyroscope 2 and an electric lamp 39 with reflector 40 are arranged on the ring 31 which carries the gyroscope 2. The lamp and reflector are located in a casing 41 which is provided with an aperture 42 opposite the lamp, through which aperture rays from the lamp are permitted to pass. The current for operating the motor 4 and the lamp 39 passes from the positive pole of the battery I through conductors 1', 21' and 22', to the said motor and lamp, thence through conductors 23', 24', 25', 26', 19' and 20', to the neutral pole of the battery.

A ring 43 having flanges 44 and 45 is rotatably arranged within the ring 33. The flange 45 carries a toothed rim 46. On the inside of the ring 43 opposite the aperture 42 is fixed a rib 48, which is adapted to cover said aperture 42 and on one side of which rib is disposed a selenium cell 47 in the path of the light from the lamp 39. The aperture 42 is exposed by the movement of the lamp 39 and the selenium cell 47 will thus be illuminated by the rays from the lamp. The ring 43 receives motion from an electromotor 49 which is fixed on the ring 33, a worm 50 on the motor shaft engaging with the rim 46. Two contact rings 51 and 52, which are insulated from each other, are arranged upon the flange 45, and are connected with the ends of the selenium cell 47; brushes 53 and 54 being provided to engage with said contact rings.

A commutator 55 comprising brushes 56 and 57 is mounted on the shaft of the motor 49. The electromotor 49 receives current from the battery I by way of the positive terminal conductors 1', 21', the selenium cell 47, and conductor 28', thence the current returns, by way of conductors 29', 26', 19' and 20', to the neutral terminal.

A ring 58 having a toothed rim is secured to the ring 33 in a plane at right angles to the axis of the pivots 34, 35. Worms 59 and 61 engage with the ring 58 and the toothed rim 23 of the ring 12 respectively, both worms being keyed on a common shaft 62 of the electromotor 60. A commutator 92 is mounted on the shaft 62 of the motor 60. Current is led from the battery I to the armature of the electromotor 60 and the commutator 92 in one direction by way of the positive terminal, conductors 1', 2', 16', the selenium cell 15, and conductors 30', 31' and 32'; or, in the other direction, by way of the negative terminal, conductors 9', 8', selenium cell 13, conductors 30', 31' and 32', in order to reverse the direction of rotation of the motor. From the motor 60, the current returns to the neutral terminal, by way of conductors 33', 29', 26', 19' and 20'. By the rotation of the electromotor 60 in the one direction, the ring 12 and the ring 58 are rotated in clockwise direction; by the rotation of the electromotor in the opposite direction the rings are rotated in counter-clockwise direction. Current is led from the negative terminal of the battery I to the brush 56 of the commutator 55, by way of conductors 9', 34' and 35'. The commutators 91, 55 and 92 serve to pass intermittent impulses of current to electromagnetic ratchet devices hereinafter described.

The geographical chart 78 on which the intended course is indicated by a conducting wire 90 is placed on a base on which are arranged two screw-threaded spindles 63$^a$ and 63$^b$ geared with the shaft 63. On the shaft 63 are mounted two ratchet wheels the teeth 67 and 68 of which are disposed in opposite directions. An electromagnet 70 is fixed on a bracket 69 close to said ratchet wheels. The electromagnet has two windings, the winding 70$^a$ of which leads, by way of the conductor 36' to the brush 57 of the commutator 55, while the other is connected by conductor 37' with a terminal 38$^x$ of the sidereal clock 19, which is of the kind adapted to establish electrical connection at periodic intervals according to sidereal time. The other terminal of the sidereal clock is connected by conductors 34', 9' with the negative terminal of the battery I. The poles of the electromagnets change according to whether the current passes through the commutator 55 or through the sidereal clock 19. The neutral terminal of the magnet 70 is connected to neutral terminal of the battery I by the conductors 40' and 20'.

A magnet 72 of constant polarity is fixed on a rocker 71 adjacent to the electromagnet 70. One or the other of the ends of the magnet 72 may be attracted by the electromagnet 70 according to the polarity of the latter. The rocker 71 is provided opposite the ratchet wheels 67 and 68 with spring pins 73 and 74 each of which engages with the teeth of the corresponding ratchet wheel, namely in upward direction from the middle position of the rocker 71. The spring 75 serves to return the rocker to its mid position. By this arrangement the shaft 63, and with it the spindles 63$^a$ and 63$^b$, are rotated in one or the other direction according to whether the current is led through the commutator 55 or through the clock 19. The spindles 63$^a$ and 63$^b$ engage correspondingly threaded holes in a slidable bridge 64 on which is mounted a screw-threaded spindle 82. At the end of the spindle 82 is arranged an electrically operated ratchet mechanism constructed in the same manner as that actuating the spindle 63 and comprising two ratchet wheels the teeth 94 and 95 of which are disposed in opposite directions and are adapted to be engaged by spring pins 94' and 95' on a rocker 96 carrying a magnet 96' of constant polarity which may be attracted in one or the other direction by an electromagnet 93, thus imparting rotation to the spindle 82. The electromagnet 93 has only one winding, one end of which is connected by conductors 38' with the brush of the commutator 92, the other end by way of conductors 39', 40' and 20' with the neutral terminal of the battery I. The spindle 82 engages an internally threaded slidable member 83 which carries, approximately at the level of the geographical chart, a rotatable disk 84 made of insulation material. Two segmental contacts 86 and 87 are fixed on the disk 84 a short distance apart (Fig. 6). Rotation is imparted to the disk 84 by means of a worm 85 and worm wheel 85'. The spindle 89 of said worm is adapted to be rotated by ratchet mechanism actuated by an electromagnet 88 and constructed in the same manner as the described mechanism for imparting rotation to the spindle 82. By the rotation of the disk 84 the said contacts are adapted to engage with the metal line or wire 90 upon the chart in one or other direction. The electromagnet 88 has one winding, one end of which is connected, by way of conductors 41, 39', 40' and 20', with the neutral terminal of the battery I, the other terminal being connected, by way of conductor 42', with the brush 43' of the commutator 91. The number of intermittent current impulses transmitted through the commutator 91 must be such that when the disk 24 is turned to the extent of 360°, the disk 84 will also turn through 360°. Current is led to contact 86 by way of conductor 44' from the positive terminal of the battery II; to the contact 87, by way of conductors 45' and 46', from the negative terminal of the same battery. The current to the conducting wire 90 passes from the neutral terminal of the battery II through conductor 47', the armature of the electromotor 97, conductor 48', electromagnet 100 and conductor 49'. The electromotor 97 actuates the rudder 99. The steering wheel 98 is operatively connected with the rudder post 102. To restore the rudder to its normal position in line with the axis of the ship, when the circuit through the contacts 86 and 87 to the electromotor 97 is interrupted, a reversing switch is provided the action of which is described below. Two metal contacts 103 and 104 which are insulated from each other are arranged symmetrically to the rudder. The contact 103 is connected, by way of conductor 50' with one terminal of the battery II—parallel with the contact 86—whereas the contact 104 is connected, by way of conductor 51' with the other terminal of the same battery. A stationary brush 105 is arranged in conjunction with the contacts 103 and 104 and is connected, by conductor 52', armature 101 and conductor 53', with the armature of the motor 97, in parallel with the conductor 90. When the rudder is in line with the axis of the ship, the brush 105 is out of engagement with the contacts 103 and 104. When, however, the rudder is brought out of its mid-position, the brush 105 will come into engagement with one or the other of the contacts, establishing a circuit through the armature of the motor in one or the other direction in consequence of which the motor 97 restores the rudder to its mid position. To prevent the current of the battery II from passing to the armature of the motor by way of the contacts 103—105 at the time when the main circuit through the wire 90 is closed by the contacts 86 or 87, a circuit breaker is provided which comprises an electromagnet 100, located in the main circuit with the line 90 and armature 97, and an armature 101 which breaks the connection of the battery II with the armature of the electromotor 97 by way of the brush 105.

The operation of the apparatus is as follows:—When the ship, flying machine or the like moves in northerly direction, the spindle of the gyroscope 1 will assume a gradually increasing inclination relatively to the horizontal, and the lamp 8 illuminates the selenium cells 13. By reason of the decrease of the resistance of the latter electrical connection is established, through conductors 9', 8', cell 13, conductors 30' and 31', between the negative pole of the battery I and the motor 60, and thence through conductors 33', 29', 26', 19' and 20', to the neutral terminal of the battery I. The motor 60 consequently rotates the ring 12 by means of the worm 61 until the aperture 11 is again covered by the intersection 18 of the screen 17, and the cell 13 is in darkness. Simultaneously impulses of electric current are passed from the negative terminal of the battery I through conductors 9', 8', cell 13, conductors 30' and 32', commutator 92 and conductor 38' to the electromagnet 93, actuating the ratchet device at the end of the spindle 82 thereby displacing the disk 84 with the contacts 86 and 87 correspondingly toward the north of the chart. When moving toward the south the inclination of the spindle of the gyroscope will proceed in the reverse direction, the cell 15 will become illuminated and current will be led, by way of conductors 1', 2', 16', cell 15, conductors 30', 31' and 32' to the motor 60 and the commutator 92 from the positive pole of the battery I so that the polarity of the electromagnet 93 will be reversed. The spindle 82 will therefore be rotated in opposite direction and the disk 84 will be moved toward the south of the chart. When the ship or flying machine is stationary the spindle of the gyroscope 2 makes one complete revolution in 24 hours owing to the rotation of the earth, when however the ship or flying machine moves toward the east or west the apparent movement of the spindle is accelerated or retarded respectively. The faster the travel in either easterly or westerly direction, the more the rate of the apparent movement of the spindle of the gyroscope will be increased or diminished. In consequence of the movement of the spindle of the gyroscope 2, the lamp 39 will illuminate the selenium cell 47 thus establishing electrical connection through the conductors 1', 21', 27', cell 40, conductor 28' and motor 49. The commutator 55 being rotated by the motor causes periodic current impulses to pass from the negative terminal of the battery I through conductors 9', 34', 35', commutator 55, and conductor 36', to the winding 70ᵃ of the magnet 70 which actuates the ratchet device at the end of the shaft 63 whereby the disk 84 with the contacts 86 and 87 is correspondingly displaced. Simultaneously the worm 50 actuated by the motor 49 imparts rotation to the ring 43 until the rib 48 covers the aperture 42 and the cell 47 is in darkness.

To compensate for the apparent motion of the spindle of the gyroscope due to the rotation of the earth the sidereal clock 19 is provided which, as previously, described, transmits periodic current impulses through conductors 9', 34', clock 19, conductor 37', and the second winding 70ᵇ of the electromagnet 70 to act upon the ratchet device in opposition to the impulses from the commutator 55 so that when the ship or flying machine is stationary the number of impulses in both windings of the electromagnet 70 is equal and no displacement is imparted to the disk 84 by the ratchet mechanism on the shaft 63. According to whether the impulses from the commutator 55 are quicker or slower than those from the clock 19 the spindle 63 will be rotated in one or the other direction and consequently the bridge 64 and thereby the disk 84 and contacts 86, 87 will be moved either toward the east or west of the chart. By northerly or southerly motion of the ship the inclination of the spindle of the gyroscope 2 is also changed, i. e. the spindle is brought out of the plane of the ring 43 carrying the cell 47. This displacement is compensated by the motor 60, the operation of which is controlled, simultaneously with the commutator 92, as described hereinbefore, by the vertical inclinations of the spindle of the gyroscope 1; a worm 59 on the spindle of the motor 60 imparting rotation to ring 58 thus returning the ring 43 into the plane of the spindle. When the ship or flying machine turns toward the left the selenium cell 16 becomes illuminated by the lamp 8 and current is led from the positive pole of the battery I by way of conductors 1', 2', 15', cell 16 and conductors 17', 12', 13 and 14' to the electromotor 29 and commutator 91. The motor 29 imparts by means of the worm 30 rotation to the disk 24 also toward the left, thus causing the aperture 11 to be again covered. Simultaneously by the rotation of the commutator 91 current impulses are led, by way of conductor 42' to the electromagnet 88, and the disk 84 is rotated to the left to a corresponding extent by means of the described ratchet mechanism and worm gearing. When the ship or flying machine turns toward the right the selenium cell 14 is illuminated with the result that the motor 29 and commutator 91 are connected, by way of conductors 9', 8', 10', cell 14, conductors 11', 12', 13' and 14', with the negative pole of the battery I so that intermittent impulses are led through the winding of the electromagnet 88 in the reverse direction and the disk 84 is consequently rotated toward the right to a corresponding extent.

The steering of the ship or flying machine is effected in the following manner: By way of example it is assumed that the conductor 90 is laid over the geographical chart 78 from a point in North America to a point in Europe. On rotation of the shaft 63 and spindle 82 by hand, the center of the disk 84 is brought over the starting point of the line 90. After first heading in the approximate course, the ship is set into motion and the motor 97 connected with the rudder. While in motion the ship or flying machine will continue to change its course until the conducting wire 90 is located between the contacts 86 and 87 the ship or flying machine being then on the intended course and the circuit through the conductor to the motor 97, is interrupted. As long as the current passes through the conductors 90 and 49' the electromagnet 100 attracts the armature 101. After the interruption of the circuit through the conductor 90 the armature 101 is released by the electromagnet, whereby the motor 97 is reversed and rotates in the opposite direction until the rudder has reached its mid position thereby keeping the ship on its course. At points where the conductor 90 is bent toward the right or left, the contact 86 by touching the line conducts current to the motor 97, whereby the course of the ship is changed to starboard or port as the case may be.

The apparatus may be used for other purposes besides those mentioned above, for instance for plotting the path of a moving object upon a geographical chart. By means of the first described portion of the apparatus it is possible to produce a net of accurate sidereal time.

Having now described my invention what I claim and desire to secure by Letters Patent of the United States is:—

1. Apparatus for steering movable objects more particularly ships and flying machines comprising, in combination, a rudder, an electromotor for actuating said rudder, a geographical chart, a conducting wire located over said chart, representing the course of the object, electrical contacts capable of moving over said chart in accordance with the movements of the object and adapted to coöperate with the said conductor, said contacts being adapted in coöperation with said conductor to transmit electric current in one or the other direction through said electromotor and actuate the rudder.

2. Apparatus for steering movable objects more particularly ships and flying machines, comprising, in combination, a rudder, an electromotor for actuating said rudder, a geographical chart, a conducting wire located on the chart, contacts movable over said chart and means for imparting to said contacts vertical, horizontal and rotary movements relatively to said chart in accordance with the movement of the object, said means comprising two gyroscopes the axis of one of which is disposed parallel to the axis of the earth, and the axis of the other is disposed in a plane at right angles to the axis of the first gyroscope, electromagnetic devices adapted to impart the said movements to the said contacts, commutators to control the action of said electromagnetic devices, means for actuating said commutators and a sidereal clock adapted to influence electrically the operation of one of said electromagnetic devices to compensate for the variation of the apparent movement of the axis of one of said gyroscopes due to the rotation of the earth.

3. Apparatus for steering moving objects particularly ships and flying machines, comprising in combination a geographical chart, a rudder, contacts capable of moving over said chart in accordance with the movements of the object and adapted to cause the actuation of said rudder, electromagnetic devices adapted to impart movement to said contacts, commutators to control the action of said devices, electromotors for operating the commutators, selenium cells in circuit with said motors, screening members, gyroscopes, lamps carried on the spindles of said gyroscopes and adapted to illuminate said cells, and thereby operate the motors, and a sidereal clock adapted to influence the operation of one of said magnetic devices to compensate for the variation of the apparent movement of the axis of one of the gyroscopes due to the rotation of the earth.

4. Apparatus for steering moving objects particularly ships and flying machines, comprising, in combination, a geographical chart, a rudder, contacts capable of moving over said chart in accordance with the movements of the object and adapted to cause the actuation of said rudder, electromagnetic devices adapted to impart movement to said contacts, motors and commutators by which the said devices are brought into operation, selenium cells in the circuits of said motors, gyroscopes, lamps carried on said gyroscopes and adapted to illuminate said cells, screening members, rings disposed in the planes of the axes of the gyroscopes and carrying said selenium cells, a disk upon which the gyroscopes are mounted, connections for actuating said rings and disk from said motors and a ring actuated by one of said motors and connected with one of said first mentioned rings and a sidereal clock adapted to influence the operation of one of the magnetic devices to compensate for the variation due to the apparent movement of the axis of one of the gyroscopes due to the rotation of the earth.

5. Apparatus for steering movable objects, particularly ships and flying machines, comprising, in combination, a geographical chart, a rudder, contacts movable over said chart, adapted to cause the actuation of said rudder, gyroscopes, motors, commutators and electromagnetic devices adapted to move said contacts over the chart in accordance with the movement of the object, said devices comprising screw spindles operatively connected with said contacts, ratchet wheels having teeth disposed in opposite directions, spring pins engaging in one or the other direction with said teeth and imparting rotation to said spindles, rockers carrying said spring pins, magnets of constant polarity fixed to said rockers and electromagnets adapted to attract the first named magnets and thus actuate said rockers.

In testimony whereof I affix my signature in presence of two witnesses.

VALERIAN ALEXIEFF.

Witnesses:
C. J. MOMICOE,
LEON FAHTADJIAN.